United States Patent [19]

Samonides

[11] Patent Number: 6,074,570
[45] Date of Patent: *Jun. 13, 2000

[54] METHOD OF MARKING USING ENCAPSULATED ETCHANT

[75] Inventor: John Samonides, Streamwood, Ill.

[73] Assignee: X-Cal Corporation, Bartlett, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/262,848

[22] Filed: Jun. 21, 1994

Related U.S. Application Data

[62] Division of application No. 07/971,351, Nov. 4, 1992, Pat. No. 5,346,738.

[51] Int. Cl.⁷ .................. B44C 1/22; C23F 1/00
[52] U.S. Cl. ............... 216/83; 216/96; 216/108; 216/54; 252/79.1; 252/79.2
[58] Field of Search ............... 106/19 R, 20 R, 106/20 C, 31.01, 31.06, 31.13; 156/625, 635, 654, 664; 428/402.2; 427/216, 218, 287; 252/79.1, 79.2; 134/3; 216/28, 32, 54, 96, 100, 103, 106, 108, 83

[56] References Cited

U.S. PATENT DOCUMENTS

| | | | |
|---|---|---|---|
| 2,441,300 | 5/1948 | Vande Bunte | 106/20 R |
| 2,962,398 | 11/1960 | Jones | 106/20 R |
| 3,963,338 | 6/1976 | Altman | 353/120 |
| 4,687,725 | 8/1987 | Wright et al. | 430/138 |
| 4,985,484 | 1/1991 | Yoshida et al. | 524/379 |
| 5,044,791 | 9/1991 | Lawson | 400/134.4 |
| 5,869,160 | 2/1999 | Mason et al. | 428/40.2 |

FOREIGN PATENT DOCUMENTS

WO 90/13361  11/1990  WIPO .

*Primary Examiner*—Marie Yamnitzky
*Attorney, Agent, or Firm*—Lee, Mann, Smith, McWilliams, Sweeney & Ohlson

[57] ABSTRACT

An identification label for permanently marking a metal or other etchable surface such as an automobile part with an identifying indicia is disclosed. The label has a protective cover sheet, a pressure sensitive adhesive irremovably affixed to the cover sheet, and a liner with a release coating removably affixed to the adhesive. An identifying indicia comprising an etchant in a visible vehicle such as a printing ink is printed on the adhesive at the interface of the removable liner and the adhesive so that when the liner is removed, the remaining portions of the label may be adhesively attached to the metal surface with the etchant of the identifying indicia in etching contact therewith. The identifying indicia will thus be etched into the surface of the part for a permanent marking of the part.

2 Claims, 1 Drawing Sheet

FIG. 1, FIG. 2, FIG. 3, FIG. 4, FIG. 5, FIG. 6, FIG. 7

METHOD OF MARKING USING ENCAPSULATED ETCHANT

This application is a division of application Ser. No. 07/971,351 filed Nov. 4, 1992 now U.S. Pat. No. 5,346,738.

This invention relates to an identification label and method for permanently marking a metal surface, such as, for example, the surface of a metal automobile part so that the marking cannot be readily removed from the part.

BACKGROUND OF THE INVENTION

For many years, it has been desirable to mark automobile parts with identifying markings so that the part could be readily identified with a particular vehicle. It has been perceived that with such a marking system, the criminal activity of stealing and disassembling automobiles for their parts, known as chop-shop operations, could be impeded, if not stopped, because if a part can be identified with a particular vehicle, the market for stolen automobile parts would materially dry up. Labels with vehicle identification numbers can readily be produced but such labels can also be readily removed without in any way damaging the part. Stamping of metal parts is prohibitively expensive and where the part is a thin metal part, such stamping operation may not be undertaken without damaging the part. Heretofore, there has been no practical way to mark automobile parts with identification numbers in such a way that the part could readily be identified with a particular automobile or owner, and the marking would not be readily removable.

It is an object of this invention to provide a label which will permit metal surfaces such as metal automobile part surfaces to be marked in such a way that the marking cannot be readily removed and so that the part can always be identified with a particular motor vehicle.

It is a further object of this invention to provide a method of marking a metal part with an identifying indicia in such a way that the indicia cannot be readily removed from the part.

SUMMARY OF THE INVENTION

In accordance with one embodiment of this invention, an identification label is provided for permanently marking a metal surface with an identifying indicia. The label comprises a protective cover sheet, preferably in the form of a transparent film, a pressure sensitive adhesive layer in intimate contact with and irremovable from the cover sheet, a liner with a release coating which is removably affixed to the adhesive, and an identifying indicia printed on the adhesive surface which is in contact with the liner. The identifying indicia is a metal etchant which is preferably encapsulated and carried in an ink or other printing fluid. Thus, when the liner is removed, the remaining portions of the label may be adhesively attached to a metal surface with the etchant forming the identifying indicia being in etching contact with that surface, whereby the indicia may be permanently etched into the metal surface.

It is preferred that the protective cover sheet be transparent and that additional identifying indicia, which may be identical to the first mentioned identifying indicia, is printed at the interface of the cover sheet and the adhesive so that it will be visible through the cover sheet. Alternatively, both the cover sheet and the pressure sensitive adhesive may be transparent or translucent so that the identifying indicia may be visible through the cover sheet and the adhesive.

BRIEF DESCRIPTION OF THE DRAWINGS

References are now made to the drawings in which:

FIG. 1 is a schematic illustration of one embodiment of a label-forming process by means of which the label incorporating the features of the present invention may be made;

FIG. 2 is an enlarged fragmentary cross-sectional view of the label cover sheet taken substantially along line 2—2 of FIG. 1;

FIG. 3 is an enlarged fragmentary cross-sectional view taken substantially along line 3—3 of FIG. 1;

FIG. 4 is an enlarged fragmentary cross-sectional view taken substantially along line 4—4 of FIG. 1;

FIG. 5 is an enlarged fragmentary cross-sectional view taken substantially along line 5—5 of FIG. 1;

FIG. 6 is an enlarged fragmentary cross-sectional view taken substantially along line 6—6 of FIG. 1; and FIG. 7 is an enlarged fragmentary cross-sectional view taken substantially along line 7—7 of FIG. 1 and showing the finished label.

DETAILED DESCRIPTION OF THE PREFERRED EMBODIMENTS

Figures 1, 2, 3, 4, 5, 6, 7:
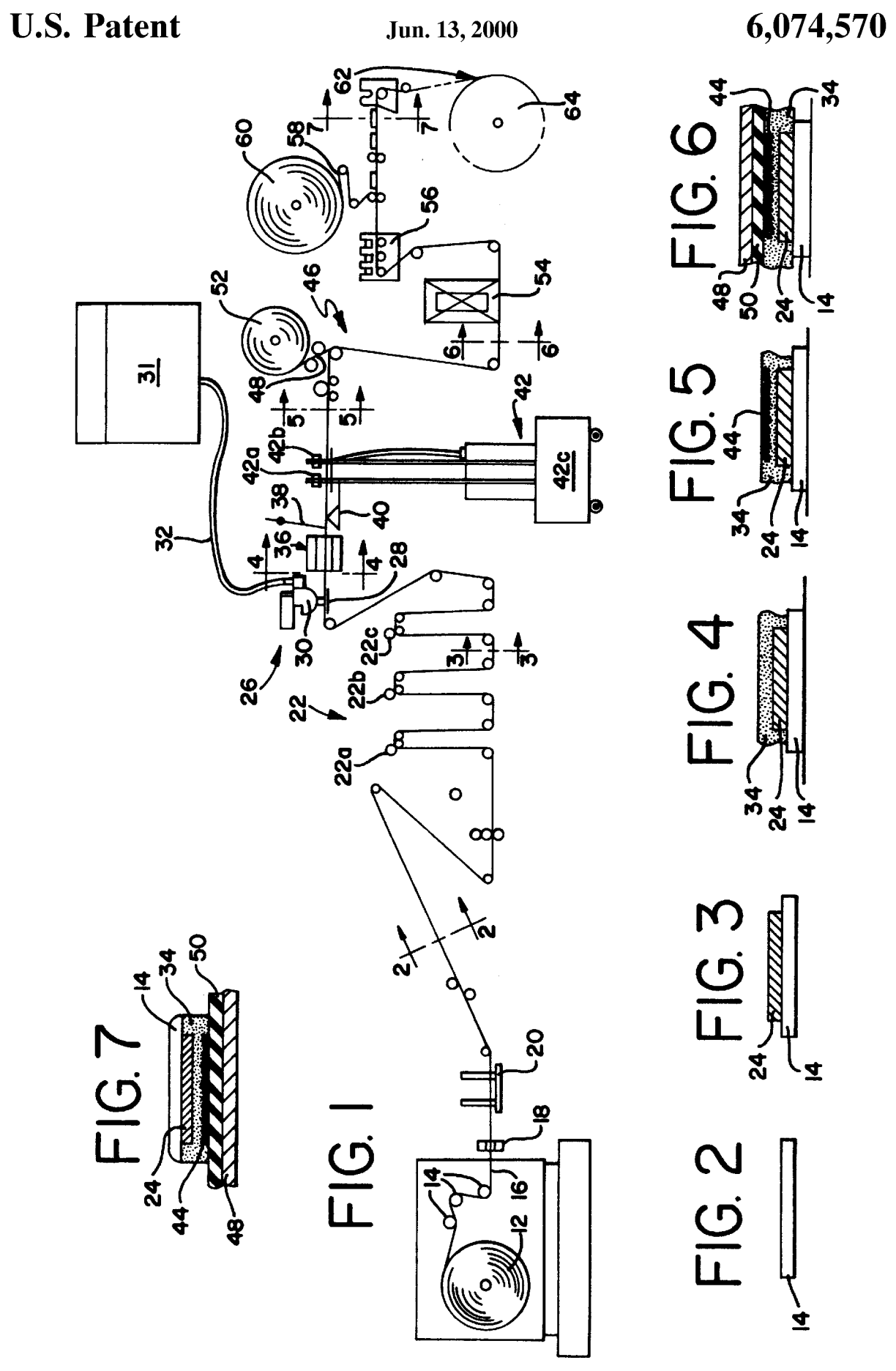

With reference particularly to FIGS. 1 through 7, there are shown schematically a label and a process for forming the label in accordance with this invention. While the product formed is a label and the apparatus and process described is a label making apparatus and process, it will be appreciated that certain aspects of the invention will have application to a wide variety of other pressure-sensitive adhesive backed products by means of which the objects of the invention can be accomplished. All such products which have an identification indicia and are adhesively applied are herein referred to as "labels".

In FIG. 7, there is shown a label constructed in accordance with this invention. This label has a preferably transparent protective cover sheet or film 14 and a pressure sensitive adhesive layer 34 irremovably adhering to the cover sheet. A first or etching indicia 44 is printed onto the inner surface of the adhesive layer 34 in a printing medium which contains or comprises a metal etchant, such as dilute hydrochloric acid. A backing or carrier sheet 48 having a release surface, preferably in the form of a silicone release coating 50, covers the inside surface of the adhesive 34 and the first or etching indicia 44. The release coating 50 permits the backing sheet 48 to be readily removed for the application of the pressure sensitive adhesive label to a metal surface, such as an automobile part, and when the label has been thus applied, the etchant will etch the indicia 44 permanently into the metal surface. A second or label indicia 24 printed is at the interface of the film 14 and the outer surface of the adhesive layer 34 and is clearly visible through the transparent protective cover sheet 14. The label indicia 24 is preferably identical to and, thus, identifies the etching indicia 44.

In FIG. 1, there is schematically illustrated a label forming press of the type which may be used to form the labels of this invention. The press is a standard, well-known color printing press of the type used to print tags and labels. On the left hand side of the press is a spool or roll 12 containing a supply of a film such as, for example, an acrylic (such as polyacrylonitrile (pan)), polyester, polypropylene, or polyethylene film. The film 14 will form the cover sheet of the label. The film 14 is passed between several guide rolls 16 and then through a web air-guide sensing pick up 18 and across a splicing block 20. The film is then guided into a color press, designated generally by the numeral 22 and having three printing stations 22a, 22b and 22c. In each of the printing stations, a mirror image printed label indicia 24 is applied to what in the finished label will be the "underside" of the film or cover sheet 14. The film 14 with the printed indicia 24 thereon is then moved to an extrusion station 26 between a supporting platen 28 and an extrusion head 30. In this station, the extrusion head receives a water-based pressure sensitive adhesive from a reservoir 31 through a conduit 32 and casts or extrudes that adhesive as an adhesive layer 34 onto the top surface of the film 14 carrying the printing 24. Thus, label indicia is at the interface between the protective film 14 and the substantially "dry" adhesive layer 34.

The adhesive 34 is preferably an acrylic emulsion adhesive (water based) of the type universally used by the tag and label industry to produce pressure-sensitive tags and labels. This adhesive, however, differs in one very important respect, it is almost "dry" as it is being applied to the substrate, that is, it has the consistency of mayonnaise rather than a liquid. One such adhesive is described in PCT/US application Ser. No. 91/02609 filed Apr. 16, 1991 as a continuation of U.S. application Ser. No. 07/509,707 filed Apr. 16, 1990 (now abandoned). Other formulations may be as follows (all ingredients being in pounds):

TABLE 1

| Formula | A | B | C | D | E | F |
|---|---|---|---|---|---|---|
| Acrylic copolymer emulsion (lbs) | 14 | 14 | 16 | 19.9 | 14 | 14 |
| Tackifier (lbs) | 13 | 7 | 14.5 | 12 | 13 | 7 |
| ZnO (lbs) | 3.5 | 4 | 3 | 2.5 | 3.5 | 4 |
| $TiO_2$ (lbs) | 3.5 | 1.5 | 2 | — | — | — |
| $CaCO_3$ (lbs) | — | — | — | — | 3.5 | 1.5 |
| Total weight | 34 | 26.5 | 35.5 | 34.4 | 34 | 26.5 |
| % Solids | 77.75 | 74.85 | 76.34 | 73.72 | 77.75 | 74.85 |

The acrylic emulsion may be a terpolymer consisting of, for example, vinyl acetate, 2 ethylhexylacrylate, and methylmethacrylate and will usually contain a surfactant as well as traces of acrylate and/or vinyl acetate monomers and formaldehyde. The acrylic emulsion is a high solids adhesive base containing between about 60 and 69% solids, which is the highest presently available commercially. One such adhesive base, GME 2397 and GME 2504 sold by Monsanto Chemical Company, includes up to 3% acrylic acid in the copolymer and up to 97% normal butyl acrylate. Another satisfactory adhesive base is sold by Air Products Corporation under the trademark Flexcryl 1625. The tackifier is preferably a rosin based tackifier, and more particularly tall oil rosin although other high solids tackifiers may be satisfactory. It is preferred that the tackifier have on the order of about 90% solids content. One such tackifier is sold under the trademark "Aquatac 9041" by Arizona Chemical Company. The acrylic copolymer emulsion, produced commercially in a reactor in processes well known to those skilled in the art, is post-blended with additional tackifier to increase the solids content of the resultant adhesive. This material is a resin which is a mixture of methyl and glycerol esters of abietic acid (sometimes called rosin acid) plus a slight excess of an anhydride such as maleic or fumaric. An excess of the carboxyl groups from the anhydrides permits the Aquatac 9041 to be easily disbursed in alkaline water permitting the very high percentage of solids in the adhesive. Since the tackifier reduces the shear factor of the adhesive, a cross linking agent such as Aziridine PFAZ-322 sold by Sybron Chemicals may have to be added.

In the foregoing formulas of Table 1, the amount of tackifier listed is the total of the tackifier in the original adhesive produced in the reactor as well as that added in the post-blending. The high solids base may also have some of the other ingredients as well as the rosin tackifiers already in the base prior to post-blending. The additional tackifier (above that present in the base), together with the $CaCO_3$ are added to bring the solids content of the post-blending mixture to above 70% and preferably in the range of between about 72 and about 80%. The titanium dioxide may be added for color. The zinc oxide is intended to contain the hydrochloric acid etchant printing medium. This may or may not be needed depending upon the encapsulation of the acid, as will be more fully described.

The adhesive is a thick, extrudable water-based acrylic adhesive which has only sufficient water content to permit extrusion, and it is applied preferably at room temperature with no additional heat. The adhesive layer 34 is, thus, in intimate contact with and irremovable from the undersurface of the protective film 14, i.e., the two cannot be separated without substantially destroying one or both of these layers. After the dry, adhesive layer 34 has been applied, the composite is then moved through a drying station 36 which may be a hot air dryer and a heat and air shield 38 may be employed to confine the heat and hot air to the drying station and preventing it from reaching the other downstream processing stations.

After passing through the heat shield, the composite web passes over a sensing pick-up unit 40 which senses and identifies an image on the bottom side of the web, i.e., the label indicia 24. Down stream from the sensing pick-up are the printing heads 42a and 42b of the printer 42. The printer 42 is adapted to print the etching indicia 44 upon the exposed surface of the adhesive 34. The printer 42 has a computer controller 42c which is responsive to the sensing pick-up 40 and causes the printer 42 to print the same image or indicia 44 onto the exposed surface of the adhesive layer 34 as the sensed indicia 24. Thus, the etching indicia 44 is identical to the label indicia 24 sensed by the sensing pick-up.

An important feature of this invention is the utilization as the printing medium of micro-encapsulated acid in an ink vehicle, such as a printing ink so that the etching indica 34 will consist of the micro-encapsulated acid carried by the ink supply vehicle and this additional indicia will be visible upon the exposed surface of the adhesive layer 34. In the preferred embodiment, the acid is a dilute hydrochloric acid, and the vehicle may be ink or another printing media, although as will be hereinafter explained additional additives may be desirable to accomplish the purposes of this invention. The microencapsulation may be of the type which holds the acid until the wall of encapsulation in which the acid slowly eats through the wall of the encapsulation material.

The following solvent-evaporation procedure was used to microencapsulate 1 N hydrochloric acid in a polystyrene wall material, which holds the acid until the wall material is ruptured.

First, an aqueous process medium was prepared. This process medium consisted of 1 N HCL and 6 wt % polyvinyl alcohol (PVA). The process medium was saturated with methylene chloride as well. More specifically, 100 mL of 6 wt % PVA was placed in a 200-mL resin kettle fitted with a truebore stirrer and a turbine impeller. Next, 8.3 mL of concentrated HCL was added dripwise to this 100 mL of PVA. The PVA solution was stirred during this addition. After the HCL was added, 0.8 mL of methylene chloride was added to the resin kettle.

Second, a 10 wt % polystyrene solution was prepared by dissolving 2.0 g of polystyrene (Type 6850, Dow Chemical, Lot #AH07090N0), in 18.0 g of methylene chloride. Then, 1 mL of 1 N HCL was added to 10 g of this 10% polystyrene solution and the mixture was homogenized for about 1 minute using a Brinkham homogenizer (Switzerland). This homogenization afforded a water-in-oil emulsion which was subsequently added to the aqueous process medium. During the addition of this water-in-oil emulsion, the process medium was stirred to afford a water-in-oil-in-water emulsion.

Third, to evaporate the methylene chloride from the emulsion, the resin kettle was sealed and the pressure inside of the kettle was reduced using a water aspirator. That is, by adjusting the pressure with a bleed valve, the pressure inside the resin kettle was reduced until a thin layer of bubbles appeared on the surface of the process medium. At this reduced pressure, the methylene chloride slowly evaporated from the emulsion over a 1-hour period.

Fourth, to collect the hardened microcapsule product, the process medium and its contents were poured onto a 25-$\mu$m sieve. The isolated microcapsule product resting on the sieve was then washed with about 100 mL of 1 N HCL, followed by a wash with deionized water. The final product contained spherical particles about 25 $\mu$m in diameter (Batch F714-031000).

When the microcapsules were ruptured on pH paper, the pH paper indicated the presence of acid. Further it was determined that the microcapsules contained 0.08 wt % HCL. This determination was made by washing an 84-mg sample of microcapsules with 3 mL of deionized water, followed by dissolving the washed microcapsules in 1 mL of methylene chloride. Next, 0.5 mL of deionized water was added to extract the HCL from the methylene chloride. After this extraction, the pH of the 3-mL aliquot was 2.46. And, it was determined that the microcapsules contained 0.08 wt % HCL. Because the theoretical acid loading was 3.65 wt %, the encapsulation efficiency was 2% of theoretical.

If the encapsulation is a time release encapsulation the encapsulating wall material may be of any material which will hold the acid for a period of time, but will be attacked by the encapsulated acid until the wall material is eaten through to release the acid. The type of material used will be dependant upon the time needed between the printing of the encapsulated acid onto the adhesive in manufacturing the label and the application of the label onto the surface being etched. The encapsulation material should, under those circumstances, be tough enough to resist rupture under normal use and application of the label. The material as a whole may be attacked over time or the material may contain imbedded particles of an attackable substance causing the acid to form pores in the encapsulating wall through which the acid can gradually seep.

It is actually preferred to have a time release encapsulation of the surface etchant if the time between label manufacture and label application can be controlled or predicted with reasonable certainty. This can generally be done by the manufacture of automobile parts, for example.

The etching indicia is formed by mixing the printing ink and encapsulated HCL in approximately equal amounts and applying this to the exposed surface of the adhesive layer 34 by the printing heads of the printer 42. The printer 42 is preferably a laser printer although it could also be a jet printer. The mode of printing should be such as to not rupture the encapsulated etchant in the printing operation. Any printer which accomplishes this could be used.

After the etching indicia with the encapsulated acid has been applied by the printing heads 42a and 42b to the exposed surface of the adhesive layer 34, the composite is then moved to a laminating station 46. In the laminating station 46, a carrier or backing sheet 48 having a silicone release coating 50 (see FIG. 6) is taken from a supply spool 52, and with the release coated side facing and in registry with the adhesive layer 34 on the film 14, these two are brought together and removably laminated together to form the composite sheet shown in FIG. 6.

Thereafter, the laminated sheet is guided through a turn bar assembly 54 of the type which is described in U.S. Pat. No. 4,068,028 which turns the sheet or web through 180° so that the film 14, which had heretofore been at the bottom of the composite, is now at the top. Thus, the inverted web is then passed to a die cutting station 56 in which the cover sheet or film 14 and adhesive layer 24 are cut through without cutting into the silicone coated backing sheet 48, and the waste material 58 is then taken up on a take up reel 60, with the finished product 62 being wound a rewind roll 64. The foregoing process produces the label shown in FIG. 7.

In use, the liner 48 with the release coating 50 is removed to expose the adhesive layer 34 with the etchant and ink imprinted indicia 44. The label is then stuck onto a metal surface such as the surface of metal automobile part. In the case of pressure rupturable capsules the adhering of the label to the metal surface places the encapsulated acid in etching contact with the surface, and those capsules which have not already ruptured in the printing operation and in the application of the release liner at the laminating station 46 are ruptured with the removal of the liner from the adhesive and the pressure of applying the label to the metal surface. When the acid contacts the metal surface, the etching indicia 44, which preferably is the same as the label indicia 24 appearing through the clear cover sheet 14, will be etched into the metal surface to permanently mark the metal surface.

It will be apparent that the etching of the indicia onto the metal surface may be accomplished without the label indicia 24 and without the clear film or cover sheet 14 because these are only a means for identifying the indicia 44 which will be etched into the metal surface. If desired, the cover sheet may merely be a printed paper cover sheet with the label indicia printed on the exterior surface of this paper cover sheet. A much more finished appearance, however, is achieved with the smooth thermoplastic protective film or cover sheet 14 through which the label indicia 24 is visible. Since the etching indicia 44 is carried in an ink vehicle, this may be rendered visible through the composite label if both the adhesive layer 34 and the film or cover sheet 14 are transparent. In the preferred embodiment, the adhesive is opaque and forms the background for the indicia 24.

It may be desirable to incorporate into the adhesive titanium dioxide for opaqueness. As stated, the zinc oxide in the formulation may be used to assist in containing the hydrochloric acid etchant printing medium. If desired a mixture of zinc and titanium oxide may be used. Of course, if the indicia 44 is printed with a non-corrosive printing media or a media which is less corrosive than the encapsulated HCL, the zinc oxide may be eliminated from the formulations, and the $TiO_2$ would be eliminated where a clear label is desired. Other well known acid containing inhibitors may be used in the place of zinc oxide. In addition, the ink vehicle may contain a solvent to soften or otherwise prepare the metal surface so that the acid may etch that surface. For example, if the surface has a protective lacquer finish, it may be desirable to incorporate a lacquer softening or dissolving agent in order to enable the etchant to contact the metal surface. The printed indicia may be an alphanumeric indicia or it may be a bar coding or any means of identifying the particular part.

With the label produced in accordance with this invention, there is provided a novel method of marking a metal part with an identifying indicia. That method comprises applying to the metal surface to be marked, a composite sheet comprising a cover sheet, a pressure sensitive adhesive layer having one surface irremovably affixed to the cover sheet, and an identifying indicia printed on the opposite surface of the adhesive layer with a metal etchant. The adhesive layer and the etchant are brought into intimate contact with the metal surface, so that the etchant, which is released alternatively either by pressure rupturing or by time release, will etch the identifying indicia into the metal surface.

The surface being marked has been described as a metal surface such as steel etched by an acid such as dilute solutions of hydrochloric acid or nitric acid. It will be appreciated that the invention will work on any etchable surface with an etchant which will permanently etch that surface. For example, a copper surface may be etched with ammonium hydroxide, chromic acid, sulfuric acid or nitric acid, an aluminum surface may be etched with sodium hydroxide, sulfuric acid, hydrofluoric acid or a glass surface may be etched with hydrofluoric acid. The etching reagents may vary widely and are well known in the art. The strength of the etching reagent may also vary widely depending upon the application.

Time release encapsulation of the surface etchant can also be employed in direct printing on an etchable surface without the presence of a label. For example, an original equipment manufacturer of automobile parts or copper printed circuit board may use an ink and encapsulated etchant mixture or emulsion to print an identification number on the product. The ink will give an above surface visual marking and the etchant when released will etch that marking into the surface of the product.

From the foregoing, it may be seen that there have provided a novel pressure-sensitive adhesive label and a method for marking a metal surface with an identifying indicia in a way in which that the indicia may not be readily removed. Thus, the part may be readily identified by examining the surface which has been etched by the label of this invention. The ready identification of metal parts, such as automobile parts, should seriously inhibit the using of stolen parts in the repair of automobiles.

It will be understood that various modifications may be made in the example embodiments heretofore set forth and that such modifications and variations will be readily apparent to those skilled in the art. It is intended that the appended claims cover all such modifications as may fall within the true spirit and scope of the invention.

What is claimed is:

1. A method of permanently marking an identifying indicia on an etchable surface, said method comprising applying to the etchable surface an indicia with a mixture of a visible ink and a time release encapsulation of a surface etchant, the encapsulation being such that the release of the encapsulated surface etchant occurs over a predetermined period of time during or after application of said mixture to said etchable surface and the release is accomplished by the dissolution of all or part of the encapsulating constituent of the mixture.

2. A method of permanently marking an identifying indicia on an etchable surface, said method comprising applying to the etchable surface an indicia with a composition comprising a time release encapsulation of a surface etchant, the encapsulation being such that the release of the encapsulated surface etchant occurs over a predetermined period of time during or after application of said composition to said etchable surface and the release is accomplished by the dissolution of all or part of the encapsulating constituent of the mixture.

* * * * *